United States Patent
Kavadeles

(10) Patent No.: US 7,200,483 B1
(45) Date of Patent: Apr. 3, 2007

(54) CONTROLLER MODULE FOR MODULAR SUPERCHARGER SYSTEM

(75) Inventor: Bill Kavadeles, Carlsbad, CA (US)

(73) Assignee: High Performance Systems, LLC, Santa Ana, CA (US)

( * ) Notice: Subject to any disclaimer, the term of this patent is extended or adjusted under 35 U.S.C. 154(b) by 240 days.

(21) Appl. No.: 11/036,545

(22) Filed: Jan. 13, 2005

(51) Int. Cl.
*G06F 19/00* (2006.01)
*F16H 59/32* (2006.01)

(52) U.S. Cl. ............... 701/100; 701/101; 701/102; 123/383; 477/32

(58) Field of Classification Search .......... 701/29, 701/34, 36, 100–102, 103–109; 123/378–379, 123/383, 559.1, 565; 477/32; 73/116, 118.2
See application file for complete search history.

(56) References Cited

U.S. PATENT DOCUMENTS

| | | | | |
|---|---|---|---|---|
| 5,753,805 | A * | 5/1998 | Maloney | 73/118.2 |
| 6,079,394 | A * | 6/2000 | Abthoff et al. | 123/559.1 |
| 6,604,514 | B1 * | 8/2003 | Englund et al. | 123/559.1 |
| 6,837,195 | B2 * | 1/2005 | Suwazono | 123/54.4 |
| 6,922,988 | B2 * | 8/2005 | Yamaguchi et al. | 60/286 |
| 7,137,384 | B1 * | 11/2006 | Kavadeles | 123/559.1 |

* cited by examiner

*Primary Examiner*—Yonel Beaulieu
(74) *Attorney, Agent, or Firm*—Farjami & Farjami LLP

(57) ABSTRACT

There is provided a supercharger controller module of a supercharger system for use in conjunction with a vehicle computer system of a vehicle engine including a microprocessor in communication with the vehicle computer system. The supercharger controller module may be configured to control a fuel system transducer of the supercharger system. The supercharger controller module may also be configured to control a vacuum system transducer of the supercharger system. The supercharger controller module may be further configured to receive instructions from a user through a remote controller panel. The microprocessor is configured to receive and modify at least one signal from the vehicle computer system, where the at least one signal controls at least one operating parameter of the vehicle engine. The microprocessor may be configured to modify a mass air flow sensor signal. The microprocessor may be further configured to control a pump of the supercharger system.

22 Claims, 4 Drawing Sheets

CONTROLLER MODULE FOR MODULAR SUPERCHARGER SYSTEM

RELATED APPLICATIONS

U.S. patent application Ser. No. 11/036,572, titled "Modular Supercharger System," filed concurrently with the present application, is incorporated by reference in its entirety and made part of the present application.

BACKGROUND OF THE INVENTION

1. Field of the Invention

The present invention relates generally to internal combustion engines. More particularly, the present invention relates to apparatus for supercharging internal combustion engines.

2. Related Art

Superchargers have become popular in recent years as an addition to internal combustion engines as a result of cost efficiency, reliability, and performance. A supercharger is basically a compressor that creates "boost" by forcing more air into the cylinders of the engine than would naturally be drawn in during the engine's intake stroke. By way of background, "boost," which is typically measured in psi (pounds per square inch), refers to the additional amount of air pressure that is forced into the air intake of the engine to overcome the vacuum force that is naturally created by the engine's air intake. By creating boost, the supercharger forces a denser fuel/air charge into the engine's combustion chamber, which creates more horsepower.

However, in order to realize the benefit of increased performance provided by the supercharger, the operation of the supercharger must be properly integrated with the vehicle onboard computer system, which electronically controls the operation of the vehicle engine. By way of background, vehicle engine operating parameters, such as fuel injector on/off duration, electronic fuel pump output, and electronic ignition timing, are typically controlled by a program stored in a memory device, such as an erasable-programmable-read-only-memory (EPROM) device, flash memory device, and the like, in the vehicle onboard computer system.

In a conventional supercharger system, the operation of the supercharger may be integrated with the operation of the vehicle onboard computer system by storing a new program into the EPROM device. However, when the vehicle requires servicing, a service shop may rescan the vehicle onboard computer system and restore it to original equipment manufacturer (OEM) specifications. As a result, the supercharger system may not operate properly when the customer receives the vehicle from the service shop. In that case, the customer would have to suffer the inconvenience of having the EPROM device in the onboard computer system re-programmed by the provider of the supercharger system.

Thus, there is an intense need for supercharger systems that can effectively integrate with a vehicle onboard computer system.

SUMMARY OF THE INVENTION

The present invention is directed to controller module for a modular supercharger system. More specifically, the invention provides a controller module that can effectively integrate a modular supercharger system with a vehicle onboard computer system.

In one aspect, a supercharger controller module of a supercharger system for use in conjunction with a vehicle computer system of a vehicle engine includes a microprocessor in communication with the vehicle computer system. The supercharger controller module may be configured to control a fuel system transducer of the supercharger system. The supercharger controller module may also be configured to control a vacuum system transducer of the supercharger system. The supercharger controller module may be further configured to receive instructions from a user through a remote controller panel.

The microprocessor is configured to receive and modify at least one signal from the vehicle computer system, where the at least one signal controls at least one operating parameter of the vehicle engine. The microprocessor may be configured to modify a mass air flow sensor signal. The microprocessor may also be further configured to modify an oxygen sensor signal. The microprocessor may be further configured to receive and modify a timing control signal from the vehicle computer system. The microprocessor may be further configured to receive and modify an electronic fuel pump control signal from the vehicle computer system. The microprocessor may be further configured to receive and modify a fuel injector control signal from the vehicle computer system. The microprocessor may be further configured to control a pump of the supercharger system. The microprocessor may be further configured to execute a diagnostics software for monitoring an operation of the vehicle computer system.

These and other aspects of the present invention will become apparent with further reference to the drawings and specification, which follow. It is intended that all such additional systems, features and advantages be included within this description, be within the scope of the present invention, and be protected by the accompanying claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present invention is directed to controller module for a modular supercharger system. The present invention may be described herein in terms of functional block components and various processing steps. It should be appreciated that such functional blocks may be realized by any number of hardware or software components configured to perform the specified functions. It should be further appreciated that the particular implementations shown and described herein are merely examples and are not intended to limit the scope of the present invention in any way.

Figure 1:
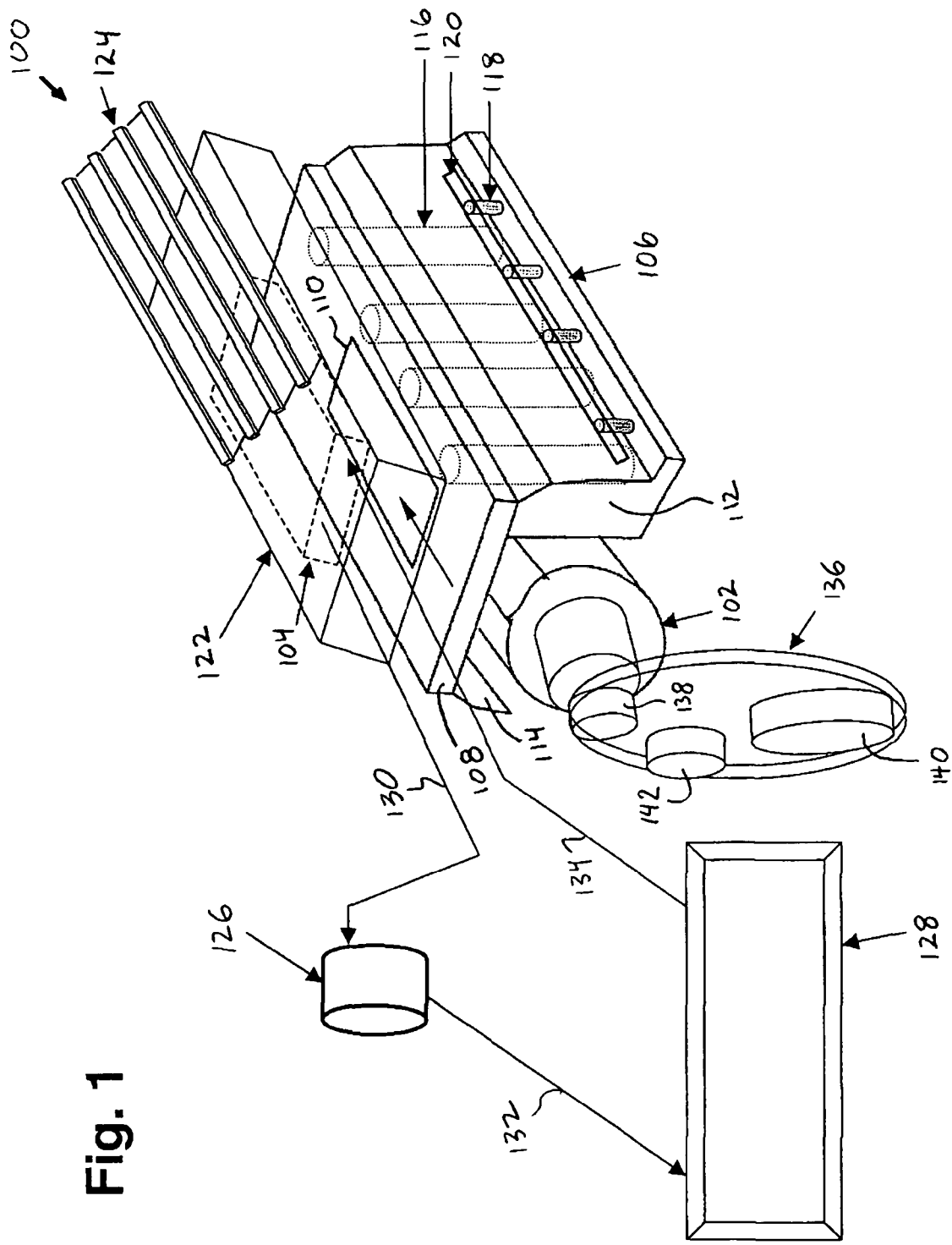
FIG. 1 illustrates a diagram of a modular supercharger system according to one embodiment of the present invention.

FIG. 1 shows a diagram of modular supercharger system 100 according to one embodiment of the present invention. Modular supercharger system 100 can be connected to an internal combustion vehicle engine (not shown in FIG. 1), such as a gasoline or diesel vehicle engine, to supercharge such vehicle engine. In one embodiment, modular supercharger system 100 may be connected to a vehicle engine having four or more cylinders. Modular supercharger system 100 uses a modular design including supercharger 102, lower intake manifold adapters 112 and 114, mounting plate 108, upper manifold plenum chamber 122, and an effective cooling system to increase performance, reduce emissions, and decrease fuel consumption of the vehicle engine. Supercharger system 100 also utilizes a cooling system component (i.e. internal heat exchanger 104) to reduce the level of sound that is generated by the supercharger.

Modular supercharger system 100 includes supercharger 102 for providing compressed air to cylinder intake valves (not shown in FIG. 1) of the vehicle engine. Supercharger 102 can be a "Roots" rotating element supercharger, a screw rotating element supercharger, a centrifugal compressor, a rotary helical element compressor, or an air pump.

Modular supercharger system 100 also includes lower intake manifold assembly 106, which replaces the intake manifold (not shown in FIG. 1) of the vehicle engine during installation of modular supercharger system 100. Lower intake manifold assembly 106 can be attached to the vehicle engine cylinder heads (not shown in FIG. 1) after the intake manifold of the vehicle engine has been removed. Lower intake manifold assembly 106 includes mounting plate 108 for attaching supercharger 102 to lower intake manifold assembly 106. For example, supercharger 102 can be mounted over the vehicle engine on a bottom surface of mounting plate 108 such that compressed air exits supercharger 102 through opening 110 in mounting plate 108. Mounting plate 108 may comprise machined aluminum. In other embodiments, mounting plate 108 may comprise cast aluminum, cast iron, steel, or composite materials.

Lower intake manifold assembly 106 also includes lower intake manifold adapters 112 and 114 for supporting mounting plate 108 and upper manifold plenum chamber 122 and for providing supercharged compressed air to cylinder intake valves (not shown in FIG. 1) of the vehicle engine via core passageways 116. Lower intake manifold adapter 112 can be attached to one vehicle engine cylinder head (not shown in FIG. 1) and lower intake manifold adapter 114 can be attached to a second vehicle engine cylinder head. Mounting plate 108 can be attached to lower intake manifold adapters 112 and 114 to allow supercharger 102 to be situated between lower intake manifold adapters 112 and 114 in an updraft configuration. In the updraft configuration, compressed air is discharged from supercharger 102 in an upward direction (i.e. in a direction away from the vehicle engine). It is noted that although only a portion of lower intake manifold adapter 114 is shown in FIG. 1, lower intake manifold adapter 114 is substantially a mirror image of lower intake manifold adapter 112.

Lower intake manifold adapters 112 and 114 may comprise machined aluminum. In other embodiments, lower intake manifold adapters 112 and 114 may comprise cast aluminum, cast iron, steel, or composite materials. Lower intake manifold adapters 112 and 114 each include core passageways 116 for providing compressed air to respective cylinder intake valves of the vehicle engine. For example, lower intake manifold adapters 112 and 114 can each include four core passageways 116. In one embodiment, lower intake manifold adapters 112 and 114 may each include three core passageways 116. Lower intake manifold adapters 112 and 114 also include fuel injectors 118 for delivering fuel to respective vehicle engine cylinders (not shown in Figure). For example, lower intake manifold adapters 112 and 114 can each include four fuel injectors 118. In one embodiment, lower intake manifold adapters 112 and 114 may each include three fuel injectors 118. The size of fuel injectors 118 may be selected to achieve an appropriate fuel flow rate to meet a particular vehicle engine application.

Fuel injectors 118 are coupled to fuel rail 120, which is coupled to a vehicle fuel pump (not shown in FIG. 1) via a vehicle fuel regulator (not shown in FIG. 1). In one embodiment, where a return-type electronic fuel injection system is used to supply fuel to the vehicle engine, a pneumatic vacuum/pressure controlled regulator may be coupled to fuel rail 120 to provide increased fuel rail pressure under boost, which provides more effective fuel atomization and, consequently, increased fuel economy.

Modular supercharger system 100 further includes upper manifold plenum chamber 122 for receiving compressed air from supercharger 102 and for housing internal heat exchanger 104, which cools the compressed air that enters upper manifold plenum chamber 122. Upper manifold plenum chamber also directs the cooled compressed air into intake valves (not shown in FIG. 1) of the vehicle engine via core passageways 116 in lower intake manifold adapters 112 and 114. Upper manifold plenum chamber 122 can be attached to mounting plate 108 and may comprise machined aluminum. In other embodiments, upper manifold plenum chamber 122 may comprise cast aluminum, cast iron, steel, or composite materials. Upper manifold plenum chamber 122 includes heat sink fins 124, which are formed in the top surface of upper manifold plenum chamber 122. Heat sink fins 124 can dissipate heat from compressed air received from supercharger 102 and can also dissipate heat conducted through lower intake manifold adapters 112 and 114. Heat sink fins 124 can dissipate heat through forced ram air that is ducted across heat sink fins 124 as a result of vehicle movement.

Modular supercharger system 100 further includes a cooling system for reducing the temperature of compressed air that is discharged from supercharger 102. The cooling system can be a liquid-to-air cooling system. In one embodiment, the cooling system may be an air-to-air cooling system. The cooling system includes internal heat exchanger 104 for cooling compressed air that is discharged from supercharger 102. Internal heat exchanger 104 can be attached to upper manifold plenum chamber 122 such that internal heat exchanger 104 is situated over opening 110 in mounting plate 108. Internal heat exchanger 104 and mounting plate 108 can form an appropriately tight seal such that substantially all of the compressed air discharged from supercharger 102 through opening 110 must pass through internal heat exchanger 104 before flowing though core passageways 116 in lower intake manifold adapters 112 and 114. Also, since internal heat exchanger 104 is situated directly over supercharger 102 in upper manifold plenum chamber 122, internal heat exchanger 104 also acts as a muffler to reduce the level of sound that is generated by supercharger 102.

Internal heat exchanger 104 may be a radiator-type cooling device or other appropriate type of cooling device and may be attached to upper manifold plenum chamber 122 by using bolts, screws, or other type of fastening devices. Internal heat exchanger 104 can include an array of passageways (not shown in FIG. 1) for circulation of fluid within internal heat exchanger 104. Internal heat exchanger 104 may further include fins to assist in heat exchange between compressed air exiting supercharger 102 and the fluid circulating in internal heat exchanger 104. Internal heat exchanger 104 also includes input and output ports (not shown in FIG. 1) to allow fluid to enter and exit internal heat exchanger 104. In one embodiment, internal heat exchanger 104 may be an air-to-air heat exchanger that can utilize air circulating in internal heat exchanger 104 to transfer heat from compressed air exiting supercharger 102.

By cooling the supercharged compressed air that is discharged from supercharger 102 before it (i.e. the compressed air) reaches the cylinder intake valves of the vehicle engine, a cooling system including internal heat exchanger 104 can advantageously increase the horsepower of the vehicle engine. By way of example, depending on ambient temperature in the vehicle engine compartment, internal heat exchanger 104 can cause a decrease in temperature of compressed air from supercharger 102 of between approximately 30.0° F. (degrees Fahrenheit) and approximately 60.0° F., which can advantageously result in an increase of between approximately 35.0 horsepower and approximately 30.0 horsepower and reduction of the risk of engine detonation. By reducing the temperature of compressed air discharged from supercharger 102, internal heat exchanger 104 can also advantageously cause an increase in vehicle fuel economy by providing the cylinder intake valves of the vehicle engine with cooler compressed air, and reduction in exhaust emissions and the risk of engine detonation.

The cooling system of modular supercharger system 100 furthers include pump 126 for pumping fluid through the cooling system. In an embodiment using an air-to-air cooling system, pump 126 may pump air through the cooling system. Pump 126 is coupled to internal heat exchanger 104 by conduit 130 and can be a 12.0 vdc coolant pump, such as a centrifugal, diaphragm, or rotary vane 12.0 vdc coolant pump. Pump 126 may be controlled by a microprocessor chip (not shown in FIG. 1). The cooling system of modular supercharger system 100 further includes external heat exchanger 128 for transferring heat from fluid that flows through the cooling system. External heat exchanger 128 is coupled to pump 126 by conduit 132 and coupled to internal heat exchanger 104 by conduit 134. External heat exchanger 128 may be a radiator-type cooling device or other appropriate type of cooling device.

External heat exchanger 128 can be mounted underneath the vehicle radiator or in front of (not shown in FIG. 1) to allow forced air to presses against external heat exchanger 128 during vehicle forward motion. The forced air that pushes against external heat exchanger 128 can dissipate heat from compressed air exiting supercharger 102, which has been transferred to fluid in the cooling system by internal heat exchanger 104. In other embodiments, external heat exchanger 128 may be mounted in different locations in the forward portion of the vehicle. Similar to internal heat exchanger 104, external heat exchanger 128 can also include an array of passageways and fins for dissipating heat in fluid flowing through external heat exchanger 128. In one embodiment, external heat exchanger 128 may be an air-to-air heat exchanger that dissipates heat in air circulating through external heat exchanger 128 through air that is forced against external heat exchanger 128 during forward motion of the vehicle. In other embodiments, the cooling system of modular supercharger system 100 may include one or more cooling system components, such as internal heat exchanger 104, pump 126, and external heat exchanger 128.

Modular supercharger system 100 further includes one or more air ducts (not shown in FIG. 1), which are coupled to supercharger 102 to provide a source of filtered air for supercharger 102. The one or more air ducts may be coupled between an air input (not shown in FIG. 1) of supercharger 102 and one or more existing air ducts (not shown in FIG. 1) in the vehicle engine compartment. Modular supercharger system 100 further includes drive belt 136 for coupling supercharger pulley 138 on supercharger 102 to engine crankshaft pulley 140 to drive supercharger 102. Modular supercharger system 100 further includes idler pulley 142 to allow proper drive belt tension and to provide sufficient belt wrap around supercharger pulley 138 to prevent drive belt slippage. In one embodiment, modular supercharger system 100 may couple supercharger pulley 138 to an existing vehicle engine drive belt to drive supercharger 102.

Figure 2:
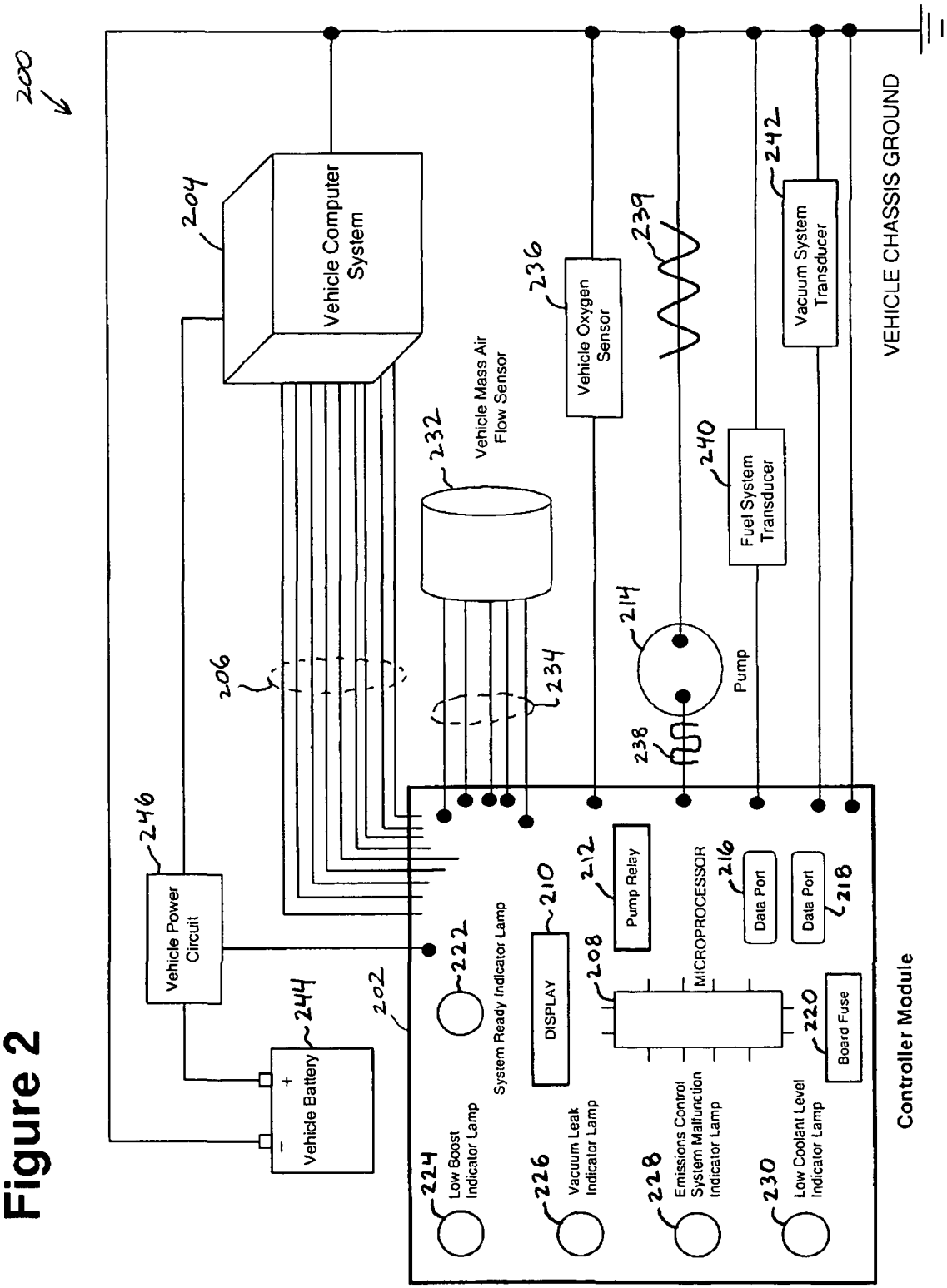
FIG. 2 illustrates an electrical schematic of a controller module for use in conjunction with the modular supercharger system of FIG. 1 according to one embodiment of the present invention.

FIG. 2 shows electrical schematic 200 including controller module 202 coupled to vehicle computer system 204 according to one embodiment of the present invention. Electrical schematic 200 includes controller module 202, which is coupled to vehicle computer system 204 via wiring harness 206. Controller module 202 can communicate with vehicle computer system 204 via wiring harness 206 to appropriately control vehicle engine operating parameters, such as fuel injector on/off duration, electronic fuel pump output, and electronic ignition timing. In one embodiment, Controller module 202 may communicate with vehicle computer system 204 via a wireless connection. By appropriately controlling vehicle engine operating parameters, controller module 202 can provide optimum fuel economy, increased engine performance, and reduced exhaust emissions for a vehicle engine attached to a supercharger system, such as modular supercharger system 100 in FIG. 1. In one embodiment, controller module 202 may be used with a turbocharger system to optimize the efficiency of the turbocharger system. In one embodiment, controller module 202 may be used with a vehicle engine that is not attached to a supercharger or turbocharger system to provide fine tuning controls that are not available from the vehicle manufacturer.

Controller module 202 can be configured to monitor and display diagnostics codes, such as onboard diagnostics (OBD) 1 and OBD 2 compliant codes, that are generated by vehicle computer system 204. Controller module 202 can also be configured to provide a visual indication of the operation of modular supercharger system 100. Controller module 202 includes microprocessor 208 and display 210. Display 210 can be controlled by microprocessor 208, and may be a digital display or a membrane keypad with LED indicators. Microprocessor 208 can be a microprocessor chip, such as those manufactured by Intel, Motorola, AMD, etc., which can be configured to control components of modular supercharger system 100, such as pump 126 and fuel injectors 118 in FIG. 1. Microprocessor 208 includes a software program for adjusting vehicle engine operating parameters, such as vehicle engine timing, fuel injector on/off duration, fuel/air mixture, fuel pump output, etc. Microprocessor 208 can be configured to receive a signal from vehicle computer system 204 corresponding to a particular vehicle engine operating parameter, analyze the signal, appropriately modify the signal to achieve desired vehicle engine operation when supercharger 102 is operating, and output the modified signal to vehicle computer system 204. As understood by one of ordinary skill in the art, such signal can be received or generated in the form of electrical signals or data signals.

For example, microprocessor 208 can be configured to receive and modify a fuel injector control signal from vehicle computer system 204 to allow fuel injectors 118 in FIG. 1 to remain on longer to provide increased fuel to the vehicle engine cylinders when supercharger 102 is operating. For example, microprocessor 208 can also be configured to receive and modify an electronic timing control signal from vehicle computer system 204 to adjust vehicle engine timing for increased vehicle engine fuel economy and horsepower during operation of supercharger 102. For example, microprocessor 208 can be further configured to received and modify an electronic fuel pump control signal from vehicle computer system 204 to achieve increased vehicle engine fuel pump output during operation of supercharger 102. Microprocessor 208 also includes diagnostics software for monitoring and testing the operation of vehicle computer system 204 during operation of supercharger 102. The diagnostics software can also be used by microprocessor 208 to display error codes on display 210 that are generated by vehicle computer system 204. In one embodiment, the diagnostics software can monitor and test the operation of vehicle computer system 204 based on the world standard of OBD I or OBD II, which is the standard for (On-Board Diagnostics) for all vehicle(s) produced worldwide.

Controller module 202 also includes pump relay 212 for turning pump 214 on and off. Pump relay 212 can be coupled to microprocessor 208, which can be configured to control the operation of pump 214. In one embodiment, controller module 202 may control the pump speed. Pump 214, which is coupled to controller module 202, corresponds to pump 126 in FIG. 1, which is used for pumping fluid through the cooling system of modular supercharger system 100. Controller module 202 further includes data ports 216 and 218, which can be coupled to microprocessor 208 for data input and output. Data port 216 can be a Universal Serial Bus (USB) port, such as USB 1.1 or USB 2.0 port, a serial data port, such as an RS-232 standard serial port, or an IEEE 1394 compliant Fire Wire port. Similar to data port 216, data port 218 can also be a USB port, a serial data port, such as an RS-232 standard serial port, or an IEEE 1394 compliant Fire Wire port. In one embodiment, data port 216 may be configured as a data input port and data port 218 may be configured as a data output port.

Controller module 202 further includes board fuse 220, which provides protection for the electrical components in controller module 202, and may be a fuse of a proper rating or standard switch type circuit breaker. Controller module 202 also includes system ready indicator lamp 222, low boost indicator lamp 224, and vacuum leak indicator lamp 226. System ready indicator lamp 222 lights to indicate that no fault codes have been detected from either vehicle computer system 204 or from diagnostics software in microprocessor 208 and, therefore, modular supercharger system 100 is ready for operation. Low boost indicator lamp 224 lights to indicate that the amount of boost that modular supercharger system 100 is generating is less than a predetermined amount of boost. Vacuum leak indicator lamp 226 lights to indicate detection of a vacuum leak in the vehicle engine vacuum system. Controller module 202 further includes emissions control system malfunction indicator lamp 228 and low coolant level indicator lamp 230. Emissions control system malfunction indicator lamp 228 lights to indicate a malfunction in the vehicle engine emissions control system. Low coolant level indicator lamp 230 lights to indicate that the level of coolant in the cooling system of modular supercharger system 100 has decreased below a predetermined coolant level.

Electrical schematic 200 also includes vehicle mass air flow sensor 232 for sensing air flow in the vehicle engine compartment. Vehicle mass air flow sensor 232 is coupled to controller module 202 by wiring harness 234. Controller module 202 can be configured to receive a mass air flow sensor signal (air flow signal) provided by vehicle mass air flow sensor 232, electronically condition the air flow signal, and input the air flow signal into microprocessor 208. For example, controller module 202 can electronically condition the air flow signal by filtering the air flow signal and clamping the peak voltage of the air flow signal at approximately 5.0 volts. Microprocessor 208 can be configured to modify the air flow signal to adjust fuel trim during the operation of supercharger 102, and output the modified air flow signal to vehicle computer system 204.

Electrical schematic 200 further includes vehicle oxygen sensor 236 for monitoring the vehicle engine's air/fuel mixture form the vehicle exhaust system. Vehicle oxygen sensor 236 can output an oxygen sensor signal, which can be coupled to controller module 202 and received by microprocessor 208. Microprocessor 208 can be configured to modify the oxygen sensor signal to appropriately adjust the vehicle engine's air/fuel mixture during operation of supercharger 102 and output the modified oxygen sensor signal to vehicle computer system 204. For example, microprocessor 208 can modify the oxygen sensor signal to increase the fuel-to-air ratio of the vehicle engine's air/fuel mixture when supercharger 102 is operating to prevent the vehicle engine from operating in a lean condition.

Electrical schematic 200 also includes inductor filter coils 238 and 239, which can be pass-through filters for eliminating electromagnet interference (EMI) produced by pump 214. Electrical schematic 200 further includes fuel system transducer 240 for indicating fuel pressure in the vehicle engine fuel system. Fuel system transducer 240, which is a component of modular supercharger system 100, can be inserted in an appropriate location in the vehicle engine fuel system and coupled to controller module 202. Fuel system transducer 240 can have a range of 0.0 psig to 100.0 psig (pounds per square inch gauge). Microprocessor 208 can be configured to receive a fuel system transducer signal provided by fuel system transducer 240 and provide a numeric indication of fuel pressure in the vehicle engine fuel system on display 210.

Electrical schematic 200 also includes vacuum system transducer 242 for indicating vacuum pressure in the vehicle engine vacuum system. Vacuum system transducer 242, which is a component of modular supercharger system 100, can be inserted in an appropriate location in the vehicle engine vacuum system and coupled to controller module 202. Microprocessor 208 can be configured to receive a vacuum system transducer signal provided by vacuum system transducer 242 and provide a numeric indication of vacuum pressure in the vehicle engine vacuum system on display 210. Microprocessor 208 can also be configured to provide a numeric indication on display 210 of boost in pounds per square inch provided by supercharger 102. Electrical schematic 200 further includes vehicle battery 244, which can provide 12.0 vdc power to controller module 202 and vehicle computer system 204. Electrical schematic 200 also includes vehicle power circuit 246, which can couple 12.0 vdc power from vehicle battery 244 to controller module 202 and vehicle computer system 204. For example, vehicle power circuit 246 can couple 12.0 vdc power from vehicle battery 244 to controller module 202 and vehicle computer system 204 when the vehicle ignition switch is in the "on" position.

Figure 3:
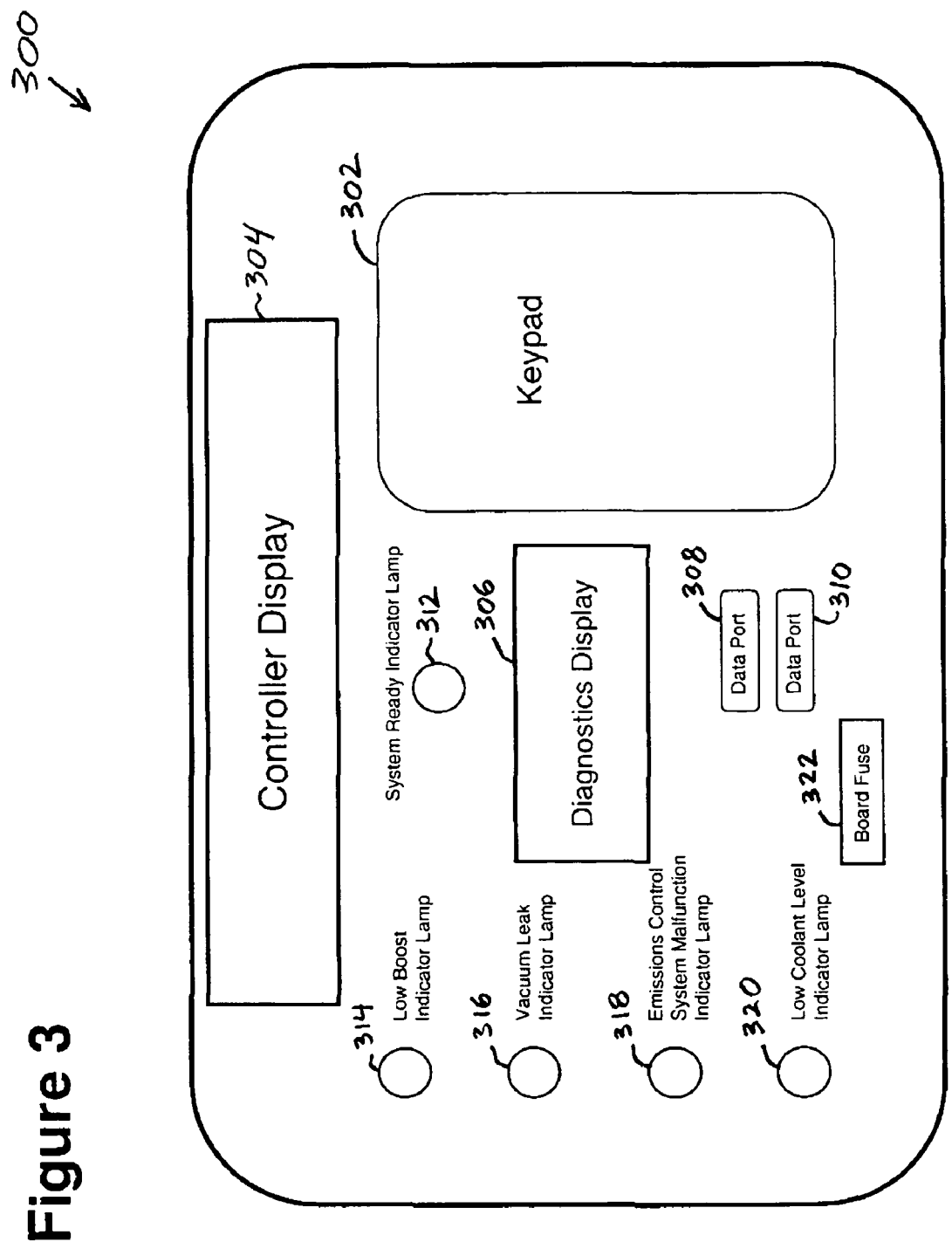
FIG. 3 illustrates a remote controller panel for use in conjunction with the controller module of FIG. 2.

FIG. 3 shows a remote controller panel 300 in accordance with one embodiment of the present invention. Remote controller panel 300 can be coupled to controller module 202 in FIG. 2 to provide a visual indication of the operation of modular supercharger system 100 from a remote location, such as a vehicle passenger compartment. A vehicle user may provide instructions to controller module 202 via remote controller panel 300 for controlling the operation of modular supercharger system 100. Remote controller panel 300 also provides data communication with controller module 202. Remote controller panel 300 can be coupled to controller module 202 via a hardwire connection. For example, remote controller panel 300 can be coupled to controller module 202 by a USB cable, which can be connected to data port 216 or data port 218. In one embodiment, remote controller panel 300 can be coupled to controller module 202 by a wireless connection. For example, transceivers, which can operate at an appropriate frequency, may be coupled to the data ports on controller module 202 and remote controller panel 300 to establish data communication between controller module 202 and remote controller panel 300.

Remote controller panel 300 includes keypad 302 for inputting data into controller module 202. Keypad 302 can be a membrane keypad or other appropriate type of keypad. Remote controller panel 300 also includes controller display 304 for displaying data provided by controller module 202. Controller display 304 can be controlled by microprocessor 208 in controller module 202, and may be a digital display or other appropriate type of display. Remote controller panel 300 further includes diagnostics display 306 for displaying vehicle diagnostic fault codes, such as OBD 1 and OBD 2 compliant codes, generated by vehicle computer system 204. In one embodiment, diagnostics display 306 may not be used.

Remote controller panel 300 also includes data ports 308 and 310 for data input and output with controller module 202. Similar to data ports 216 and 218 in controller module 202, data ports 308 and 310 can each be a USB port, RS-232 standard serial port, IEEE 1394 compliant Fire Wire port, or other type of data port. Remote controller panel 300 further includes system ready indicator lamp 312, low boost indicator lamp 314, vacuum leak indicator lamp 316, emissions control system malfunction indicator lamp 318, and low coolant level indicator lamp 320, which are similar in operation and function to respective system ready indicator lamp 222, low boost indicator lamp 224, vacuum leak indicator lamp 226, emission control system malfunction indicator lamp 228, and low coolant level indicator lamp 230 in controller module 202. Remote controller panel 300 also includes board fuse 322, which provides protection for the electrical components in remote controller panel 300, and may be a fuse of a proper rating or standard switch type circuit breaker.

Figure 4:
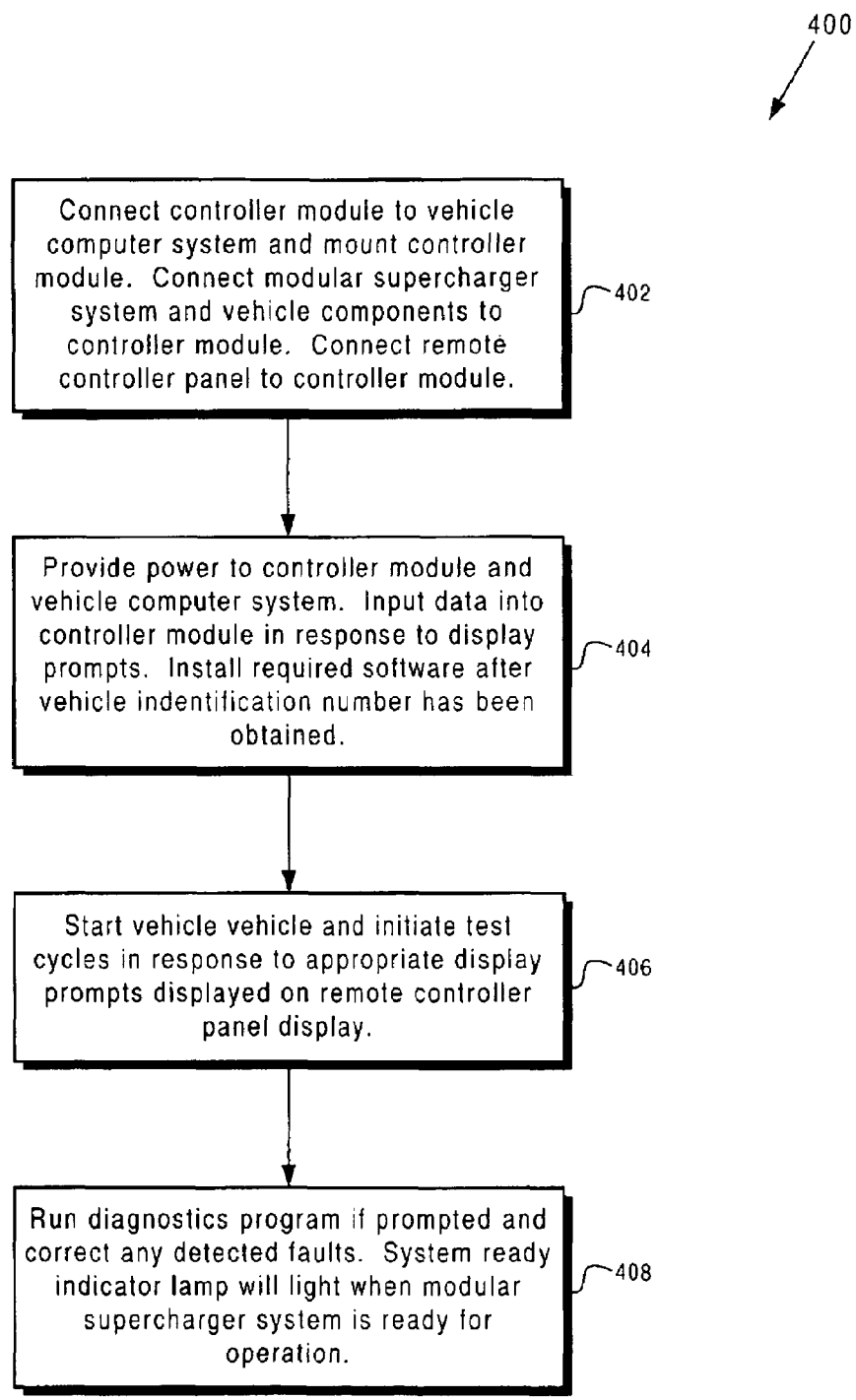
FIG. 4 illustrates a flow diagram for use in conjunction with the modular supercharger system of FIG. 1, the controller module of FIG. 2, and the remote control panel of FIG. 3.

FIG. 4 illustrates a flow diagram 400 for initial setup of controller module 202 in FIG. 2 and modular supercharger system 100 in FIG. 1 with a vehicle computer system. As shown in FIG. 4, in step 402 controller module 202 can be connected to vehicle computer system 204 via wiring harness 206 and can be mounted in the vehicle engine compartment. For example, controller module 202 may be mounted on the vehicle firewall. Modular supercharger system components, such as pump 214, fuel system transducer 240, and vacuum system transducer 242, and vehicle components, such as vehicle mass air flow sensor 232, vehicle oxygen sensor 236, and vehicle power circuit 246, can be connected to the controller module 202. Remote controller panel 300 can be connected to controller module via a cable, such as a USB cable.

In step 404, 12.0 vdc power can be applied to controller module 202 and vehicle computer system 204 by setting the vehicle ignition switch to the "on" position to activate vehicle power circuit 246. In response to prompts on controller display 304 on remote controller panel 300, appropriate data can be entered into controller module 202 via keypad 302. After controller module 202 has been initialized, vehicle computer system 204 can be scanned to obtain the vehicle identification number (VIN). After the VIN has been obtained, controller module 202 will recognize the VIN and will request installation of appropriate software via display prompt. The appropriate software can then be received by controller module 202 by a laptop computer or other appropriate device, which can be coupled to data port 308 or data port 310 on remote controller panel 300.

In step 406, the vehicle can be started and test cycles can be initiated in response to appropriate display prompts on controller display 304. In step 408, diagnostics software can be run if requested by an appropriate display prompt on controller display 304. Appropriate indicator lamps can also light on controller module 202 and remote controller panel 300 when faults corresponding to respective indicator lamps have been detected. When faults have been detected, appropriate OBD standard codes, such as OBD 2 standard codes, corresponding to the detect faults can be displayed on diagnostics display 306 on remote controlled panel 300. After any detected faults have been corrected, system ready indicator lamp 222 on controller module 202 and system ready indicator lamp 312 on remote controller panel 300 will light to indicate that modular supercharger system 100 is ready for operation.

A novel controller module for a modular supercharger system for supercharging a vehicle engine has been hereby presented. The present invention may be embodied in other specific forms without departing from its spirit or essential characteristics. The described embodiments are to be considered in all respects only as illustrative and not restrictive. Those skilled in the art will recognize that changes and modifications may be made to the embodiments without departing from the scope of the present invention. These and other changes or modifications are intended to be included within the scope of present invention, as broadly described herein.

What is claimed is:

1. A supercharger controller module of a supercharger system for use in conjunction with a vehicle computer system of a vehicle engine, said supercharger controller module comprising:
   a microprocessor separate from and in communication with the vehicle computer system;
   wherein said microprocessor is configured to receive and modify at least one signal from said vehicle computer system, and wherein said at least one signal controls at least one operating parameter of said vehicle engine.

2. The supercharger controller module of claim 1, wherein said microprocessor is configured to modify a mass air flow sensor signal.

3. The supercharger controller module of claim 1, wherein said microprocessor is configured to modify an oxygen sensor signal.

4. The supercharger controller module of claim 1, wherein said microprocessor is configured to receive and modify a timing control signal from said vehicle computer system.

5. The supercharger controller module of claim 1, wherein said microprocessor is configured to receive and modify an electronic fuel pump control signal from said vehicle computer system.

6. The supercharger controller module of claim 1, wherein said microprocessor is configured to receive and modify a fuel injector control signal from said vehicle computer system.

7. The supercharger controller module of claim 1, wherein said controller module is configured to control a fuel system transducer of said supercharger system.

8. The supercharger controller module of claim 1, wherein said controller module is configured to control a vacuum system transducer of said supercharger system.

9. The supercharger controller module of claim 1, wherein said controller is configured to receive instructions from a user through a remote controller panel.

10. The supercharger controller module of claim 1, wherein said microprocessor is configured to control a pump of said supercharger system.

11. The supercharger controller module of claim 1, wherein said microprocessor is configured to execute a diagnostics software for monitoring an operation of said vehicle computer system.

12. A supercharging method for use by a supercharger system in conjunction with a vehicle computer system of a vehicle engine, said supercharging method comprising:
   receiving at least one signal from said vehicle computer system by a microprocessor of said supercharger system, wherein said microprocessor is separate from and in communication with said vehicle computer system;
   modifying said at least one signal by said microprocessor to generate a modified signal; and
   controlling at least one operating parameter of said vehicle engine based on said modified signal.

13. The supercharging method of claim 12, wherein said receiving receives a mass air flow sensor signal from said vehicle computer system, and wherein said modifying modifies said mass air flow sensor signal to generate said modified signal.

14. The supercharging method of claim 12, wherein said receiving receives an oxygen sensor signal from said vehicle computer system, and wherein said modifying modifies said oxygen sensor signal to generate said modified signal.

15. The supercharging method of claim 12, wherein said receiving receives a timing control signal from said vehicle computer system, and wherein said modifying modifies said timing control signal to generate said modified signal.

16. The supercharging method of claim 12, wherein said receiving receives a electronic fuel pump control signal from said vehicle computer system, and wherein said modifying modifies said electronic fuel pump control signal to generate said modified signal.

17. The supercharging method of claim 12, wherein said receiving receives a fuel injector control signal from said vehicle computer system, and wherein said modifying modifies said fuel injector control signal to generate said modified signal.

18. The supercharging method of claim 12 further comprises controlling a fuel system transducer of said supercharger system.

19. The supercharging method of claim 12 further comprises controlling a vacuum system transducer of said supercharger system.

20. The supercharging method of claim 12 further comprises receiving instructions from a user through a remote controller panel.

21. The supercharging method of claim 12 further comprises controlling a pump of said supercharger system.

22. The supercharging method of claim 12 further comprises executing a diagnostics software to monitor an operation of said vehicle computer system.

\* \* \* \* \*